United States Patent [19]

Nonaka

[11] Patent Number: 5,291,353
[45] Date of Patent: Mar. 1, 1994

[54] RECODING AND/OR REPRODUCING APPARATUS
[75] Inventor: Akifumi Nonaka, Kanagawa, Japan
[73] Assignee: Sony Corporation, Tokyo, Japan
[21] Appl. No.: 765,267
[22] Filed: Sep. 25, 1991
[30] Foreign Application Priority Data Oct. 9, 1990 [JP] Japan .................................. 2-271590

[51] Int. Cl.⁵ ............................................. G11B 5/008
[52] U.S. Cl. ............................... 360/96.5; 360/137
[58] Field of Search ............................ 360/96.5, 137

[56] References Cited
U.S. PATENT DOCUMENTS 4,388,712  6/1983  Timm .............................. 360/137
4,464,694  8/1984  Kondo .
5,119,251  6/1992  Matsuda ........................... 360/96.5
5,124,854  6/1992  Iyota et al. ...................... 360/96.5

OTHER PUBLICATIONS

Exhibit A, Evans' Catalog, (1989–1990) p. 315.

Primary Examiner—Paul M. Dzierzynski
Assistant Examiner—Don Wong
Attorney, Agent, or Firm—Lewis H. Eslinger; Jay H. Maioli

[57] ABSTRACT

A recording and/or reproducing apparatus comprises a display panel which is disposed at such a position as not to face a cassette pressing member between a lid and a holder, thus making it possible to provide display portions by making effective use of a space defined between the lid and holder.

3 Claims, 3 Drawing Sheets

RECODING AND/OR REPRODUCING APPARATUS

BACKGROUND OF THE INVENTION

This invention relates to a recording and/or reproducing apparatus, and more particularly is applicable to a digital audio tape recorder for example.

Conventionally, as such a magnetic recording and/or reproducing apparatus has been known the one (referred to as a digital audio tape recorder hereinafter) adapted to convert an audio signal into a digital signal and obliquely record it onto a magnetic tape in sequence.

In case that such a kind of digital audio tape recorder could be made small in size and driven by means of a battery, it is supposed that it might become possible to enjoy music by carrying the portable digital audio tape recorder as required and to improve its usefulness.

If a display could be formed from a liquid-crystal display board so that a residual amount of a tape, an operation mode and the like could be confirmed through the display it would be convenient.

But, when the display is formed in that way, operation members cannot be correspondingly reduced in size without making their operation difficult.

Instead of making the operation members smaller in size, it may also be thought possible to make the display board smaller in size. But a small display becomes inconvenient to look at. In short, it is difficult to make the digital audio tape recorder smaller.

SUMMARY OF THE INVENTION

In view of the foregoing, an object of this invention is to provide a small recording and/or reproducing apparatus equipped with a display portion.

The foregoing object and other objects of the invention have been achieved by the provision of a recording and/or reproducing apparatus which have a holder 22 adapted to be opened and closed together with a lid 20 as one unit with respect to a main body, and is adapted to mount a cassette 40 to the main body by accommodating the cassette 40 within the holder 22 and closing the lid 20, characterized in that the recording and/or reproducing apparatus is provided with the holder 22 so held as to face the lid 20; a cassette pressing member 28A, 28B, 44 so disposed on a surface of the holder 22 on the side of the lid 20 as to position the cassette 40 in place by pressing the cassette 40; a display panel 47 so held as to face the lid 20 at such a position as not to face the cassette pressing member 28A, 28B, 44 between the lid and said holder; and the lid 20 having a window 48 formed in its surface facing said display panel 47.

Since the display panel 47 is disposed at such a position as not to overlap the cassette pressing member 28A, 28B 44 between the lid 20 and the holder 22, it becomes possible to make effective use of a space between the lid 20 and the holder 22 so as to dispose the display panel 47 effectively and as a result to make the entire configuration smaller and thinner by that disposition.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

One embodiment of the present invention will be explained in detail with reference to the attaching drawings hereinafter.

Figure 1:
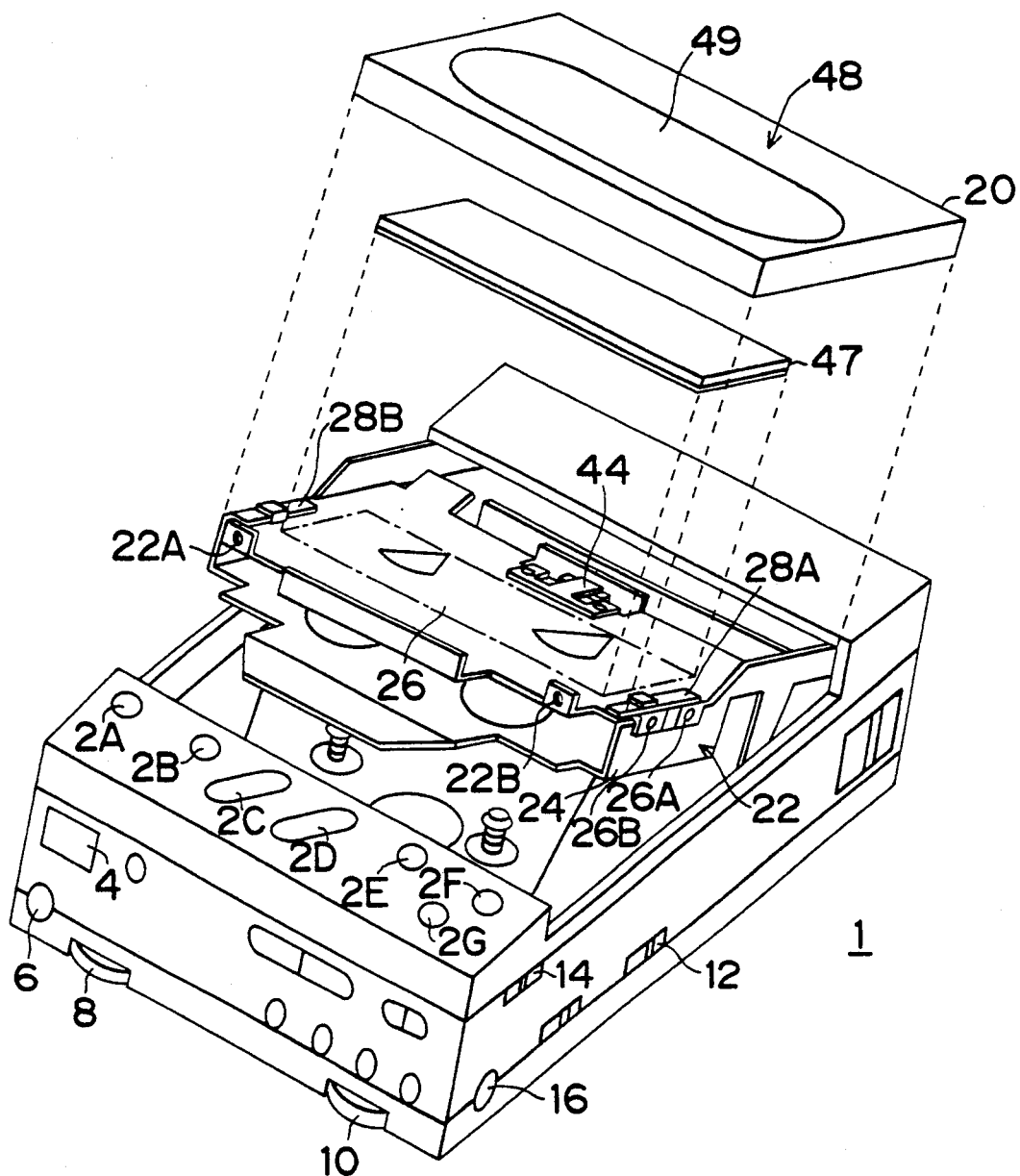
FIG. 1 is a perspective view snowing a digital audio tape recorder as one embodiment of the present invention.

In FIG. 1, the symbol 1 designates a digital audio tape recorder which is adapted to be driven by means of a battery electrically connected to a backside thereof.

Thereby, the digital audio tape recorder 1 is adapted to play a pleasant music and the like even though it is carried to a place where an electric power supply source is not available.

Further, the digital audio tape recorder 1 has operation members 2A–2G such as an eject button, a playback button, a record button, a fast-forward button, a rewind button and so on arranged in its upper front portion, and its operation mode is adapted to be changed by manipulating these operation members 2A–2G.

Furthermore, the digital audio tape recorder 1 has an electric power source switch 4, an earphone jack 6, a volume control and recording level control operation members 8, 10 and so on arranged in its front surface, whereby the operation members to be frequently used are centrally disposed in the upper front portion and the front surface.

The digital audio tape recorder 1 has changeover switches 12, 14 for changing it over to the input mode and the recording mode whose frequencies in use are relatively low, disposed in its side together with a microphone input terminal 16 and so on.

Thereby, the digital audio tape recorder 1 can be made small in size as well as designed to effectively avoid a degradation of its operability by making effective use of a correspondingly small-sized region where the operation members and the like can be arranged.

The upper side of the digital audio tape recorder 1 is covered by a lid 20 pivotally supported thereby, and the lid 20 is adapted to be opened by operatively pushing the eject button 2A.

The lid 20 is fixedly secured to threaded holes 22A, 22B of a cassette holder 22 by means of screws and adapted to be pivoted interlockingly with a pivotal movement of the cassette holder 22.

The cassette holder 22 is mounted by threadably securing an upper plate 26 to a lower plate 24 having a ]-shaped cross-section by means of screws 26A, 26B. When it is pivoted after the cassette has been accommodated within a region defined as a rectangular configuration surrounded by the upper plate 26 and the lower plate 24, the cassette is mounted in place.

Figure 2:
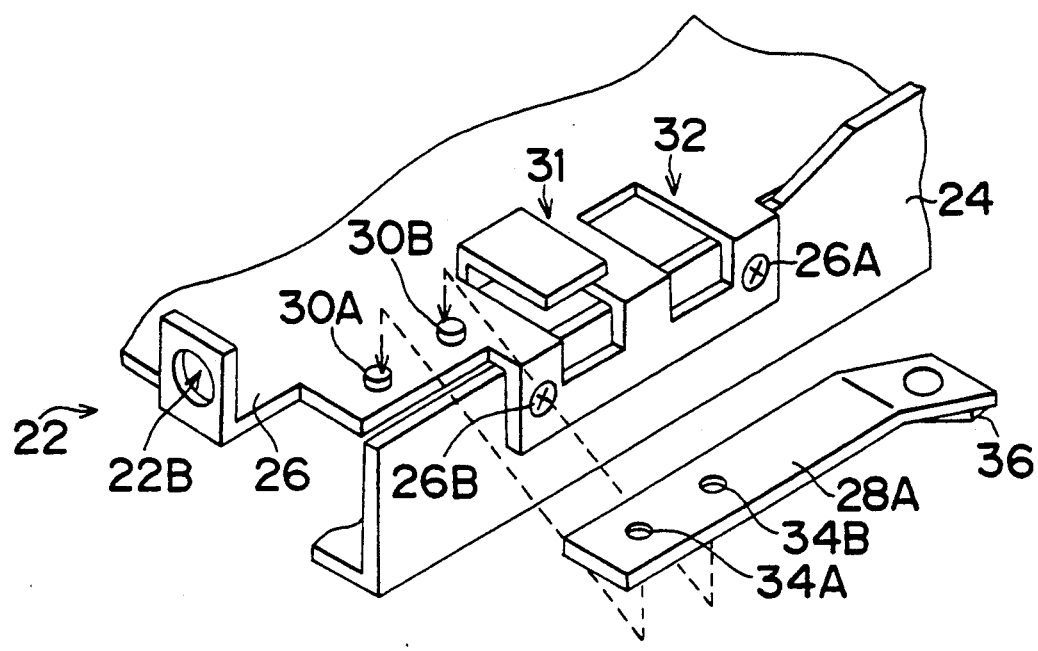
FIG. 2 is a perspective view showing a detailed construction of the digital audio tape recorder

Thereupon, as shown in FIGS. 1 and 2, the cassette holder 22 is adapted to press the cassette toward the side of the lower plate 24 through cassette pressing members 28A, 28B arranged in the opposite sides of the upper plate 26, whereby the cassette is adapted to be held in place.

That is, the upper plate 26 has column-like projections 30A, 30B formed by being punched out from the side of the lower plate 24 as well as has a pressing portion 31 and a window 32 for each of the cassette pressing members 28A, 28B, formed in order in its deep portion behind the projections 30A, 30B.

The pressing portion 31 is formed by cutting over the upper plate 26 and bending the cut piece and serves to hold the cassette pressing member 28A, 28B therebetween.

On the other hand, the cassette pressing member 28A, 28B is formed from a spring member and has through-holes 34A, 34B cut out corresponding to the projections 30A, 30B.

Thereby, the cassette pressing member 28A, 28B can be secured simply and with high accuracy at the position defined by the through-holes 34A, 34B and the projections 30A, 30B by fitting the through-holes 34A, 34B to the projections 30A, 30B after having been so brought as to be caught in the pressing portion 31 as indicated by the arrows.

Further, thereupon, since the cassette pressing members 28A, 28B can be held in a simple construction by holding the cassette pressing members 28A, 28B in such a manner as to be caught in the pressing portion 31, the digital audio tape recorder 1 can be simplified in construction as well as have the cassette holder 22 thinned in entire thickness.

Further, the cassette pressing members 28A, 28B have a triangular pressing portion 36 at their leading ends respectively, and the pressing members 36 serve to press down the tape cassette through the window 32.

Figure 3:
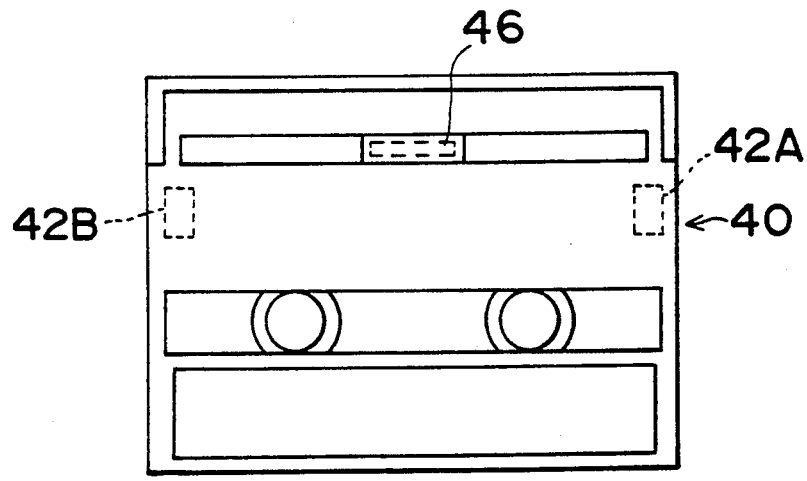
FIG. 3 is a plan view showing a cassette tape.

That is, as indicated by the broken line in FIG. 3, the pressing portions 36 serve to press predetermined upper left and right regions 42A, 42B of the tape cassette 40 by being resiliently urged by the cassette pressing members 28A, 28B.

Thereby, the cassette pressing members 28A, 28B press the tape cassette 40 so as to push it to the lower plate 24, so that the tape cassette 40 is held in place.

On the other hand, similarly a cassette pressing member 44 formed from a spring-like member is fixedly secured to the central deep portion of the upper plate 26 by making use of eyelets.

That is, the cassette pressing member 44 has an extended central portion, which is provided at its leading end with a triangular projecting pressing portion (not illustrated).

Further, the cassette pressing member 44 has opposite ends extended left and right, whose leading ends are fixedly secured to the upper plate 26 by means of the eyelets.

By securing the cassette pressing member 44 through the eyelets in that way, the cassette pressing member 44 can be fixedly secured to the upper plate 26 in a simple construction as well as the cassette holder 22 can be made thin in entire thickness.

The upper plate 26 is provided with a window formed therein corresponding to the pressing portion of the cassette pressing member 44. Thereby, the pressing portion of the cassette pressing member 44 serves to press the tape cassette 40 through the window.

Accordingly, the cassette pressing member 44 presses the concave portion 46 of the tape cassette 40 through its pressing portion, so that the tape cassette 40 is held in place as well as pressed toward the side of the lower plate 24.

A display panel 47 is disposed between the cassette holder 22 and the lid 20, so that the operation modes of the digital audio tape recorder 1, a residual amount of the tape in the tape cassette 40 and so on can be confirmed through the display panel 47.

Figure 4:
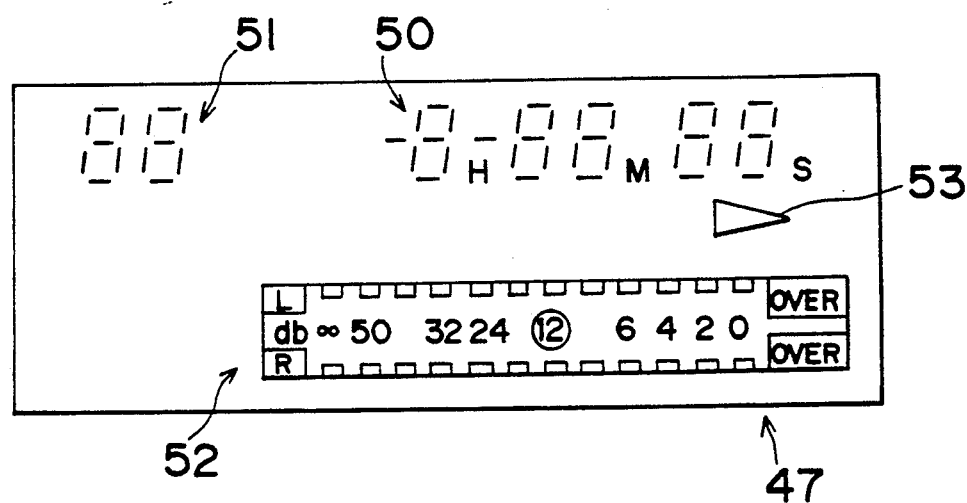
FIG. 4 is a plan view showing a display panel.

That is, the display panel 47 is made by disposing a liquid crystal display panel as shown in FIG. 4 onto a plate-like luminous element composed of an EL (an electroluminescence) and interposed between the lid 20 and the upper plate 26 except the cassette pressing members 28A, 28B, 44.

Incidentally, the liquid crystal display panel comprises a display portion 50 for displaying a tape residual amount, a play time and so on, a display portion 51 for program numbers, a display portion 52 for a signal level and a display portion 53 for displaying a playback operation and the like.

Corresponding thereto the lid 20 has the window 48 formed above the display panel 47, and the window 48 is covered by a transparent member 49 from inside of the lid 20.

Thereby, a user can confirm the tape residual amount and the like through the window 48, so that the use convenience of the digital audio tape recorder 1 can be improved by that.

Thereupon, since the display panel 47 is interposed between the lid 20 and the cassette holder 22, the display portions can be formed by making effective use of the upper surface of the digital audio tape recorder 1. Accordingly, the digital audio tape recorder 1 can be made smaller in size by that without sacrificing its operability.

Further, thereupon, since the display panel 47 is interposed in the space defined between the lid 20 and the upper plate 26 excluding the cassette pressing member 28A, 28B, 44, it becomes possible to insert the display panel 47 into a small space defined between the lid 20 and the upper plate 26.

Accordingly, since it is possible to accommodate the display panel by making effective use of the space between the lid 20 and the upper plate 26, the lid 20 and the cassette holder 22 can be reduced in thickness by that correspondingly so that the entirely thinned and small-sized digital audio tape recorder 1 can be provided.

According to the above-mentioned construction, since the display panel 47 is interposed between the lid 20 and the upper plate 26 excluding the cassette pressing members 28A, 28B, 44, the display panel 47 can be so disposed as to make effective use of the space defined between the lid 20 and the upper plate 26.

Thereby, since the display portions can be formed by making effective use of the upper surface of the digital audio tape recorder 1, the digital audio tape recorder 1 can be made smaller and thinner in dimension by that effective use without sacrificing its operability.

Incidentally, though the above-mentioned embodiment has explained the lid 20 and the holder 22 which are adapted to be provided, the present invention is not limited to that but it is also widely applicable to, for example vertically liftable ones.

Further, though the above-mentioned embodiment has explained the case in which the present invention was applied to the portable digital audio tape recorder, the present invention is not limited to that but it is also applicable to a stationary digital audio tape recorder.

Further, the present invention is not only applicable to the digital audio tape recorder but also widely applicable to a recording and/or reproducing apparatus which records and reproduces various kinds of signals such as an audio signal, a digital signal and so on.

As noted above, according to the present invention, since a display panel is disposed at such a position as not to face a cassette pressing member between a lid and a holder, it becomes possible to provide display portions by making effective use of a space defined between the lid and the holder.

Thereby, it is possible to provide the display portions by making effective use of the upper surface of the lid as well as it is possible to achieve a correspondingly small-sized and thinned type recording and/or reproducing apparatus which is equipped with the display portions.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A recording and/or reproducing apparatus which mounts a cassette, the recording and/or reproducing apparatus comprising:

a lid formed with a window;
   a holder for holding said cassette adjacent to the lid;
   cassette pressing and positioning means for pressing said cassette towards a predetermined position, said cassette pressing and positioning means being disposed on a side of said holder towards said lid, in which said cassette pressing and positioning means comprises at least two portions, one of said portions being on one edge and another of said portions being on an opposite edge of said holder and in which said holder is formed with at least two openings and an edge of each of said at least two portions of said cassette pressing and positioning means contacts said cassette respectively through said at least two openings; and
   a display panel mounted on said side of said holder between said at least two portions of said cassette pressing and positioning means in non-overlapping relation to said cassette pressing and positioning means and adjacent to a surface of said window, thereby enabling a reduction in thickness of the recording and/or reproducing apparatus.

2. A recording and/or reproducing apparatus according to claim 1 in which said holder is formed with an upper plate and said cassette pressing and positioning means is mounted on a side of the upper plate towards said lid.

3. A recording and/or reproducing apparatus according to claim 1 in which said cassette is formed with a concave portion ad said cassette pressing and positioning means i provided at a position for engagement with said concave portion.

* * * * *

UNITED STATES PATENT AND TRADEMARK OFFICE
CERTIFICATE OF CORRECTION

PATENT NO. : 5,291,353
DATED : March 1, 1994
INVENTOR(S) : Akifumi Nonaka

It is certified that error appears in the above-indentified patent and that said Letters Patent is hereby corrected as shown below:

On the Title page, item [54] and col. 1, line 2, change "RECODING" to --RECORDING--.
Column 2, line 8, after "recorder" insert --;-- line 23, delete "a"--.
Column 6, line 28, change "ad" to --and--.
          line 29, change "i" to --is--.

Signed and Sealed this

Third Day of January, 1995

Attest:

BRUCE LEHMAN

Attesting Officer      Commissioner of Patents and Trademarks